US007483254B1

(12) United States Patent
Wang

(10) Patent No.: US 7,483,254 B1
(45) Date of Patent: Jan. 27, 2009

(54) CONTROL CIRCUIT OF A BISTABLE PERMANENT MAGNET OPERATING MECHANISM

(76) Inventor: Guangshun Wang, Suite 3111, Gaoxin Building, YuQing East Street, WeiFang City, Shandong Province (CN) 261061

( * ) Notice: Subject to any disclaimer, the term of this patent is extended or adjusted under 35 U.S.C. 154(b) by 0 days.

(21) Appl. No.: 12/077,481

(22) Filed: Mar. 19, 2008

(30) Foreign Application Priority Data

Sep. 24, 2007 (CN) ........................ 2007 1 0154528

(51) Int. Cl.
*H01H 9/00* (2006.01)
*H01H 47/00* (2006.01)
*F16K 31/08* (2006.01)

(52) U.S. Cl. ........................................ 361/189; 251/65

(58) Field of Classification Search ................. 361/189; 251/65

See application file for complete search history.

(56) References Cited

U.S. PATENT DOCUMENTS

2008/0024044 A1 * 1/2008 Palmer et al. ............. 310/68 R

FOREIGN PATENT DOCUMENTS

CN 98220417.5 9/1999

* cited by examiner

*Primary Examiner*—Michael J Sherry
*Assistant Examiner*—Dharti H Patel
(74) *Attorney, Agent, or Firm*—Hamre, Schumann, Mueller & Larson, P.C.

(57) ABSTRACT

The present invention relates to an automatic controlled operating mechanism, in particular, relates to a control circuit of a bistable permanent magnet operating mechanism. The control circuit comprises a permanent magnet operating mechanism and a pulse signal control circuit connected to pulse coils of the permanent magnet operating mechanism. The pulse signal control circuit comprises a switch-off energy storage circuit, a switch-on energy storage circuit, a switch-off contact switch, and a switch-on contact switch. With the switch-off contact switch and switch-on contact switch, the pulse coils of the permanent magnet operating mechanism are connected in the circuit in such a way that they are in series connection for switch-on and in parallel connection for switch-off. This reduces the relatively high running speed in earlier switch-on period, to reduce switch-on noise and prolong the service life. In addition, this increases the instantaneous opening speed in the initial switch-off period, to reduce generation of switch-off voltaic arc. By using the two coils in the bistable permanent magnet operating mechanism, raw material can be saved, the mechanism volume can be reduced, and the failure rate can be lowered.

3 Claims, 2 Drawing Sheets

CONTROL CIRCUIT OF A BISTABLE PERMANENT MAGNET OPERATING MECHANISM

FIELD OF INVENTION

This invention relates to an automatic controlled operating mechanism. In particular, it relates to a control circuit of a bistable permanent magnet operating mechanism.

BACKGROUND OF THE INVENTION

Permanent magnet operating mechanism is a mechanical device that uses pulse-electromagnetic force to conduct state conversion, and uses permanent magnet force to facilitate action and maintain state. For example, CN patent No. ZL98220417.5, entitled "A Permanent Magnet Operating Mechanism for Vacuum Switch", owned by this Applicant, discloses such a permanent magnet operating mechanism. It includes an output shaft, a fixed core on the output shaft, a permanent magnet disposed outside the core, and an impulse coil placed on outside of each end of the permanent magnet respectively. The output shaft extends out from the center of the two impulse coils. The permanent magnet operating mechanism has the features of prompt action, automatic maintaining stabilization of the state upon action, etc., so that it usually acts as the operating mechanism for an electric switch. However, in practice, it is found that during operation, though switch-off/switch-on may be achieved if applying pulses to switch-off coil and switch-on coil respectively, the action noise and electricity consumption may be substantial. Such a permanent magnet operating mechanism, upon satisfying reliable switch-on current condition, the instantaneous closing speed is relatively high, and the noise of switch-on is high; while the instantaneous opening speed is relatively low, and the breaking ability is relatively poor. As to the switch-off/switch-on operation of a vacuum breaker, the best design is: the initial speed of switch-on action is relatively low, upon instantaneous closing, the switch-on pulse peak current reaches a maximum value. This facilitates reducing noise, prolonging the service life of components, and assuring reliable switch-on. The switch-off action shall be quick, especially the instantaneous opening speed. However, during later switch-off period, the acceleration declines, to reduce impact among components, and to reduce voltaic arc at instantaneous opening.

SUMMARY OF THE INVENTION

The object of the present invention is to provide a control circuit of a bistable permanent magnet operating mechanism, that has low noise and reasonable speed for switch-off/switch-on action, long service life, compact structure, and low failure rate.

To achieve the above objects, the present invention provides the following technical solutions:

The control circuit of a bistable permanent magnet operating mechanism according to the present invention comprises a permanent magnet operating mechanism, and a pulse signal control circuit connected to pulse coils of the permanent magnet operating mechanism. An output shaft is positioned in a housing of the permanent magnet operating mechanism. The output shaft extends out through end covers on the housing ends. Its front end connects to a performing mechanism. A core is secured onto the output shaft. A permanent magnet is positioned outside of the core. The permanent magnet and the housing are securely connected. A first pulse coil and a second pulse coil are positioned on an end of the permanent magnet, respectively, characterized in: The pulse signal control circuit comprises a switch-off energy storage circuit, a switch-on energy storage circuit, a switch-off contact switch, and a switch-on contact switch. The switch-off contact switch and the switch-on contact switch are triple synchro switches, wherein two terminals of a first set switch-off contacts of the switch-off contact switch are connected to a negative terminal of the switch-off energy storage circuit and upper end of the first pulse coil, respectively. The upper end of the first pulse coil is connected to upper end of the second pulse coil via a second unilateral diode. Two terminals of a third set switch-off contacts of the switch-off contact switch are connected to a positive terminal of the switch-off energy storage circuit and lower end of the second pulse coil, respectively. The lower end of the second pulse coil is connected to lower end of the first pulse coil via a first unilateral diode. Two terminals of a first set switch-on contacts of the switch-on contact switch are connected to upper end of the first pulse coil and positive terminal of the switch-on energy storage circuit, respectively. Two terminals of a second set switch-on contacts of the switch-on contact switch are connected to lower end of the first pulse coil and upper end of the second pulse coil, respectively. Two terminals of a third set switch-on contacts of the switch-on contact switch are connected to lower end of the second pulse coil and negative terminal of the switch-on energy storage circuit, respectively.

The above switch-on energy storage circuit comprises a switch-on current limiting resistor, a discharging resistor, and a switch-on energy storage capacitor, wherein two terminals of the discharging resistor are connected to two outputs of a DC power supply, respectively. One terminal of the switch-on current limiting resistor connects positive electrode of the switch-on energy storage capacitor, and the other terminal connects negative terminal of the DC power supply. The negative electrode of the switch-on energy storage capacitor connects negative terminal of the DC power supply.

The above switch-off energy storage circuit comprises a secondary charging current limiting resistor and a secondary energy storage capacitor, upon series connection, connected to two terminals of the DC power supply; and, a switch-off current limiting resistor and a switch-off energy storage capacitor, upon series connection, connect two terminals of the DC power supply. The second set switch-off contacts of the switch-off contact switch, upon in series connection with the discharging current limiting resistor and switch-off diode, connects to positive electrodes of the secondary energy storage capacitor and switch-off energy storage capacitor, respectively. One terminal of the quick charging current limiting resistor connects to the common terminal of the second set switch-off contacts and switch-off diode, and the other terminal connects to positive terminal of the DC power supply.

With the above technical solutions, the present invention has the following advantages:

A) Reducing the relatively high running speed of the components during early switch-on period, so as to reduce the noise of switch-on action and prolong the service life of the components.

B) Increasing the instantaneous opening speed during the initial switch-off period, so as to reduce occurrence of switch-off voltaic arc.

C) Fully using two coils in the bistable permanent magnet operating mechanism to adjust switch-off speed, to save material, and to reduce mechanism volume. As the number of control parts and electronic components reduces, failure rate of the control circuit is greatly decreased.

D) Satisfying switch-off/switch-on requirements and re-switch-on requirements of the vacuum breaker permanent magnet operating mechanism. It is simple and reliable.

DETAILED DESCRIPTION OF THE PREFERRED EMBODIMENT

Figure 1:
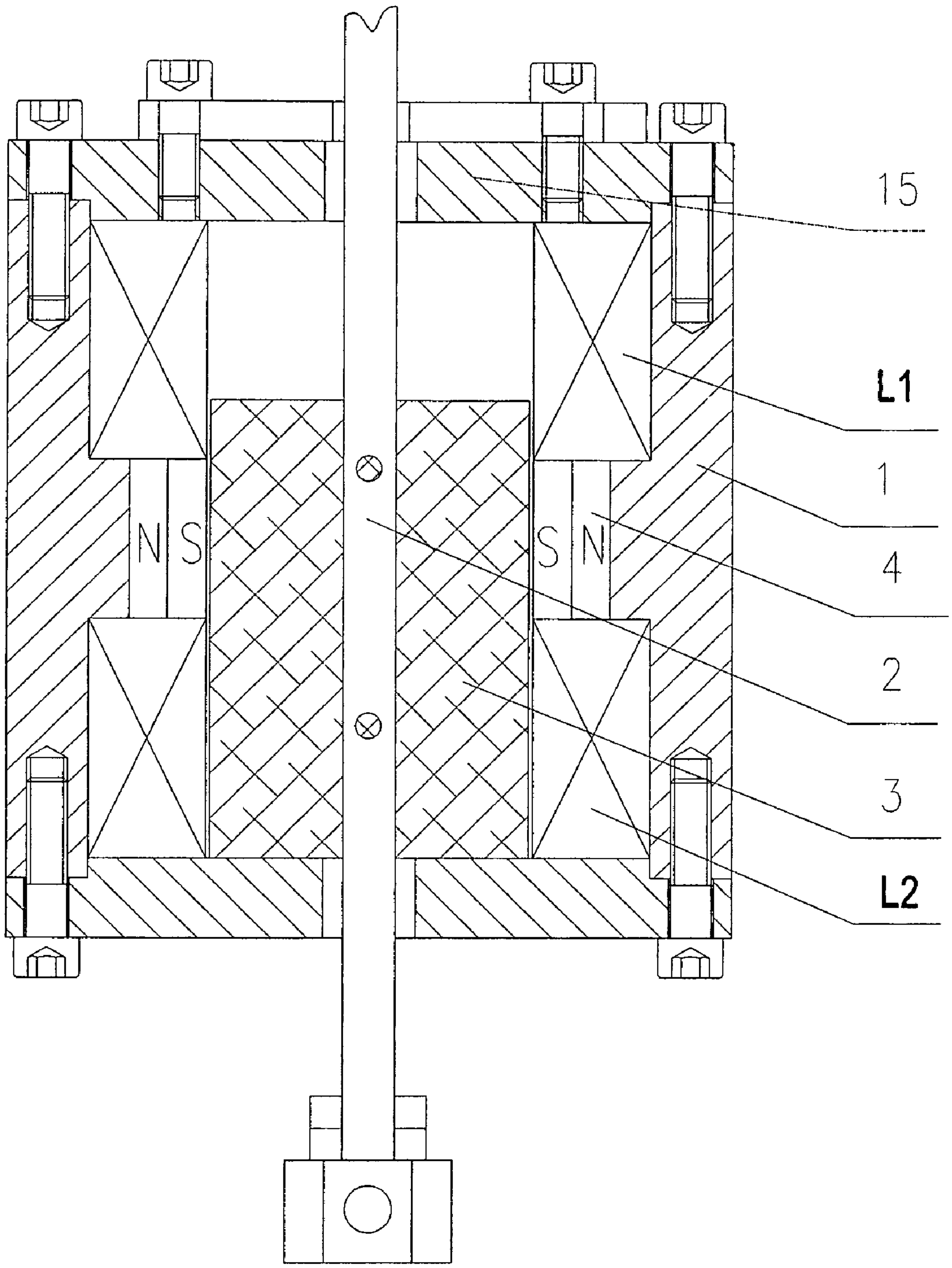
FIG. 1 is a schematic view of a permanent magnet operating mechanism according to one embodiment of the present invention.

As shown in the drawings, a control circuit of a bistable permanent magnet operating mechanism of the present invention includes a permanent magnet operating mechanism, and a pulse signal control circuit connected on pulse coils of the permanent magnet operating mechanism. As shown in FIG. 1, housing 1 of the permanent magnet operating mechanism has an output shaft 2 therein. The output shaft 2 extends out through end covers 15 on both ends of the housing 1, in which the front end connects to a performing mechanism through a link pin, and the rear end securely connects to an end cap 9. The housing 1 and end covers 15 are made of conductive magnetic ferro-material. An anti-magnetic bush is mounted onto the contact region of the output shaft 2 and housing 1. The mid-section of output shaft 2, located in the housing 1, has a core 3 securely mounted thereto. The outer side of the core 3 has a permanent magnet 4. The permanent magnet 4 and the housing 1 are securely connected. A first pulse coil L1 and a second pulse coil L2 are respectively positioned on an end of the permanent magnet 4.

The principle of the permanent magnet operating mechanism is as follows: Applying pulse current to the first pulse coil L1 and the second pulse coil L2, in which the pulse current generates an induced magnetic field in the coils. A portion of the induced magnetic field is used to balance out a magnetic field generated by the permanent magnet 4. Another portion of the induced magnetic field acts on the core 3, to generate magnetic suck force to move the core 3, which finally is adhered to an end cover 15 at one end under a joint force of electromagnetic force and permanent magnet attraction. When the core 3 moves, it brings the performing mechanism connected on the output shaft 2 to conduct switch-off/switch-on action. Once the current in the coils disappears, the magnetic field generated by the pulse current also disappears. With the magnetic field generated by the permanent magnet 4, the core 3 still adheres to the end cover 15, and the switches remain operating state after the action. When the operating state needs to be changed, i.e., when performing switch-off or switch-on action, it only needs to apply a reverse pulse current to the first pulse coil L1 and the second pulse coil L2, to make the output shaft 2 to move in the opposite direction, so that the core 3 adheres to the end cover 15 on the other end, to achieve conversion of the operating state, and remain stable.

Figure 2:
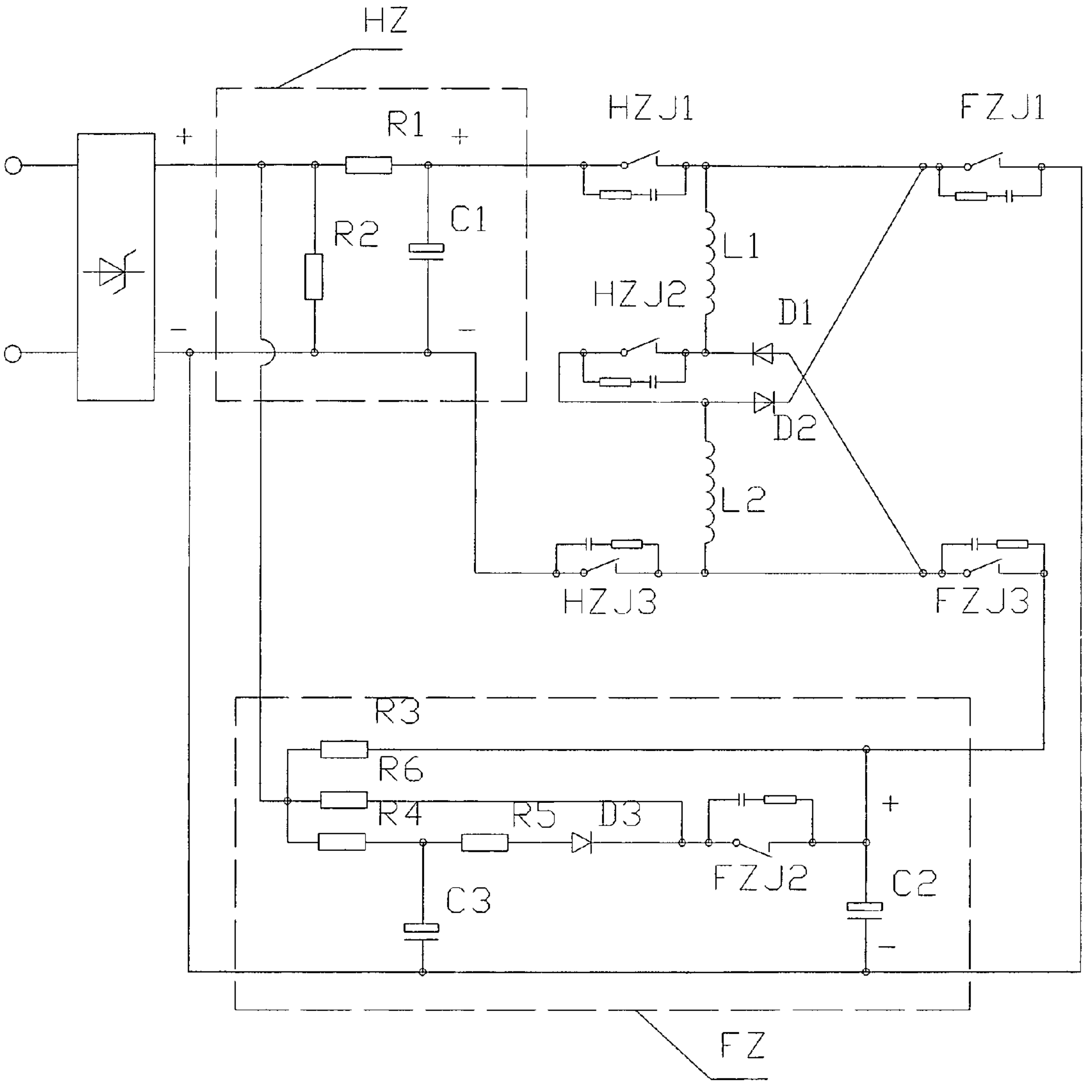
FIG. 2 is a circuitry showing a pulse signal control circuit according to one embodiment of the present invention.

As shown in FIG. 2, the pulse signal control circuit comprises a switch-off energy storage circuit FZ, a switch-on energy storage circuit HZ, a switch-off contact switch, and a switch-on contact switch. The switch-off contact switch and the switch-on contact switch are triple synchro contact switches. That is, each switch has three (3) sets of contacts, which can act simultaneously. The two terminals of a first set switch-off contacts FZJ1 of the switch-off contact switch are connected to negative terminal of the switch-off energy storage circuit and upper end of the first pulse coil L1, respectively. The upper end of the first pulse coil L1 connects upper end of the second pulse coil L2 through a second unilateral diode D2. The two terminals of a third set switch-off contacts FZJ3 of the switch-off contact switch are connected to positive terminal of the switch-off energy storage circuit and lower end of the second pulse coil L2, respectively. The lower end of the second pulse coil L2 connects to lower end of the first pulse coil L1 through a first unilateral diode D1. The two terminals of a first set switch-on contacts HZJ1 of the switch-on contact switch are connected to upper end of the first pulse coil L1 and positive terminal of the switch-on energy storage circuit HZ, respectively. The two terminals of a second set switch-on contacts HZJ2 of the switch-on contact switch are connected to lower end of the first pulse coil L1 and upper end of the second pulse coil L2, respectively. The two terminals of a third set switch-on contacts HZJ3 of the switch-on contact switch are connected to lower end of the second pulse coil L2 and negative terminal of the switch-on energy storage circuit HZ, respectively.

In operation, when switch-on operation is required, the three sets of contacts on the switch-on contact switch are closed simultaneously; while the first set switch-off contacts FZJ1 and the third set switch-off contacts FZJ3 of the switch-off contact switch are open, and the second set switch-off contacts FZJ2 is closed. The current from the switch-on energy storage circuit positive terminal in turn flows through first set switch-on contacts HZJ1, first pulse coil L1, second set switch-on contacts HZJ2, second pulse coil L2, third set switch-on contacts HZJ3, and returns to negative terminal of the switch-on energy storage circuit. Here, the first pulse coil L1 and the second pulse coil L2 are actually in series connection. The discharging time constant is increased, and the switch-on pulse peak current is delayed until instantaneous closing the vacuum breaker contacts. In addition to ensure effective switch-on, this facilitates reducing the relatively high running speed in early switch-on period, decreasing switch-on noise, and prolonging the service life.

When switch-off operation is required, the three sets of contacts of the switch-on contact switch are all open; while the first set switch-off contacts FZJ1 and the third set switch-off contacts FZJ3 of the switch-off contact switch are closed simultaneously, and the second set switch-off contacts FZJ2 is open. The current from the switch-off energy storage circuit positive terminal, upon through the third set switch-off contacts FZJ3, is divided into two paths, one flows successively through first unilateral diode D1, first pulse coil L1, first set switch-off contacts FZJ1, and returns to negative terminal of the switch-off energy storage circuit; and, the other one flows successively through second pulse coil L2, second unilateral diode D2, first set switch-off contacts FZJ1, and returns to negative terminal of the switch-off energy storage circuit. In this way, the first pulse coil L1 and the second pulse coil L2 are actually in parallel connection. The discharging time constant is decreased, which advances the switch-on pulse current peak, with increased amplitude. The reduced effective discharging time is helpful to increase the instantaneous opening speed of the vacuum breaker contacts, reduce the running speed in the later switch-off period, and reduce mechanical impact.

The switch-on energy storage circuit HZ is mainly comprised of electrolytic capacitors with high capacitance and periphery circuits, and used to provide instantaneous large current for switch-on action. The switch-on energy storage circuit HZ comprises a switch-on current-limiting resistor R1, a discharging resistor R2, and a switch-on energy storage capacitor C1, wherein two terminals of the discharging resistor R2 are connected to two outputs of the DC power supply respectively, one terminal of the switch-on current-limiting resistor R1 connects positive electrode of the switch-on energy storage capacitor C1 and the other terminal connects positive terminal of the DC power supply, and negative electrode of the switch-on energy storage capacitor C1 connects to negative terminal of the DC power supply. The switch-on energy storage capacitor C1 is used to store certain amount of charges, to provide large current required during switch-on action. The switch-on current-limiting resistor R1 is used to prevent generating overload large current during charging the switch-on energy storage capacitor C1, and to reduce voltaic arc of the switch-on contact switch contacts upon switch-on. The discharging resistor R2 is used to minimize the effects of instantaneous high voltage on the switch-on energy storage capacitor C1. In addition, it discharges the switch-on energy storage capacitor C1, switch-off energy storage capacitor C2, and secondary energy storage capacitor C3 during maintenance (power cut), to ensure safety of the operators.

The switch-off energy storage circuit FZ is mainly comprised of electrolytic capacitors with high capacitance and periphery circuits, and used to provide instantaneous large current for switch-off action, and to meet sequential switch-off and re-switch-on requirements. The switch-off energy storage circuit FZ comprises a secondary charging current-limiting resistor R4 and a secondary energy storage capacitor C3, upon series connection, connected to two terminals of the DC power supply. The switch-off energy storage circuit FZ further includes a switch-off current-limiting resistor R3 and a switch-off energy storage capacitor C2, upon series connection, connected to two terminals of the DC power supply. The second set switch-off contacts FZJ2 of the switch-off contact switch, upon series connection with a discharging current-limiting resistor R5 and a switch-off diode D3, connects to positive terminals of the secondary energy storage capacitor C3 and the switch-off energy storage capacitor C2, respectively. One terminal of a quick charging current-limiting resistor R6 is connected to a common terminal of the second set switch-off contacts FZJ2 and switch-off diode D3, and the other terminal is connected to positive terminal of the DC power supply. The switch-off energy storage capacitor C2 is used to store a certain amount of charges, to provide large current required during switch-off action. The secondary energy storage capacitor C3 is used to pre-store certain amount of charges, to quickly charge the switch-off energy storage capacitor C2 after discharging and before charging the switch-off energy storage capacitor C2, without increasing DC power capacity, to prepare for next switch-off action, and to allow the switch-off energy storage circuit FZ to meet sequential switch-off requirements when vacuum breaker is in re-switch-on. The switch-off diode D3 is used to prevent the current of the quick charging current-limiting resistor R6 flowing to the secondary energy storage capacitor C3, under the circumstance of certain DC power capacity, to assure the priority of supplementary charging the switch-off energy storage capacitor C2.

The principle of the switch-off energy storage circuit FZ is as follows: During switch-off operation, the first set switch-off contacts FZJ1 and the third set switch-off contacts FZJ3 are closed, and the second set switch-off contacts FZJ2 is open, the switch-off energy storage capacitor C2 discharges. Upon switch-off operation completes, the first set switch-off contacts FZJ1 and the third set switch-off contacts FZJ3 are open, and the second set switch-off contacts FZJ2 is closed. The secondary energy storage capacitor C3 supplementarily charges the switch-off energy storage capacitor C2 through discharging current-limiting resistor R5 and switch-off diode D3. At the same time, the DC power supply also charges the switch-off energy storage capacitor C2 through switch-off current-limiting resistor R3 and quick charging current-limiting resistor R6. This may assure quick charging the switch-off energy storage capacitor C2, while meeting the requirements of quick re-switch-on.

The second switch-off contacts FZJ2 use NC (Normally Closed) contacts, which have the following functions: When conducting switch-off, the second set switch-off contacts FZJ2 is disconnected first, to prevent the secondary energy storage capacitor C3 from discharging to the first pulse coil L1 and the second pulse coil L2. During switch-off, discharging the switch-off energy storage capacitor C2 alone may meet the switch-off requirements. When switch-off completes, the second set switch-off contacts FZJ2 are closed, to quickly release charges in the secondary energy storage capacitor C3 to the switch-off energy storage capacitor C2, to ensure that the switch-off energy storage capacitor C2 can complete charging before conducting second time switch-off.

Accordingly, the description is not intended to limit the invention to the form disclosed herein. Also, it is intended that the appended claims be construed to include alternative embodiments.

We claim:

1. A control circuit of a bistable permanent magnet operating mechanism, including a permanent magnet operating mechanism and a pulse signal control circuit connected to a pulse coil of the permanent magnet operating mechanism, the permanent magnet operating mechanism having a housing (1), with an output shaft (2) positioned therein, the output shaft (2) extending out through an end cover (15) on an end of the housing (1), with an front end connecting to a performing mechanism, the output shaft (2) having a core (3) secured thereto, the core (3) having a permanent magnet (4) arranged outside of the core (3), the permanent magnet (4) and the housing (1) being securely connected, with a first pulse coil (L1) and a second pulse coil (L2) respectively positioned on an end of the permanent magnet (4), characterized in:

the pulse signal control circuit comprising a switch-off energy storage circuit (FZ), a switch-on energy storage circuit (HZ), a switch-off contact switch, and a switch-on contact switch, the switch-off contact switch and the switch-on contact switch being triple synchro contact switches, wherein two terminals of a first set switch-off contacts (FZJ1) of the switch-off contact switch being connected to a negative terminal of the switch-off energy storage circuit (FZ) and an upper end of the first pulse coil (L1) respectively, and, the upper end of the first pulse coil (L1) being connected to an upper end of the second pulse coil (L2) through a second unilateral diode (D2);

wherein two terminals of a third set switch-off contacts (FZJ3) of the switch-off contact switch being connected to a positive terminal of the switch-off energy storage circuit (FZ) and an lower end of the second pulse coil (L2) respectively, and, the lower end of the second pulse coil (L2) being connected to an lower end of the first pulse coil (L1) through a first unilateral diode (D1);

wherein two terminals of a first set switch-on contacts (HZJ1) of the switch-on contact switch being connected to the upper end of the first pulse coil (L1) and a positive terminal of the switch-on energy storage circuit (HZ) respectively;

wherein two terminals of a second set switch-on contacts (HZJ2) of the switch-on contact switch being connected to the lower end of the first pulse coil (L1) and the upper end of the second pulse coil (L2) respectively; and wherein two terminals of a third set switch-on contacts (HZJ3) of the switch-on contact switch being connected to the lower end of the second pulse coil (L2) and a negative terminal of the switch-on energy storage circuit (HZ) respectively.

2. The control circuit of a bistable permanent magnet operating mechanism according to claim 1, wherein:

the switch-on energy storage circuit (HZ) comprises a switch-on current-limiting resistor (R1), a discharging resistor (R2) and a switch-on energy storage capacitor (C1), wherein two terminals of the discharging resistor (R2) being connected to two outputs of a DC power supply respectively, one terminal of the switch-on current-limiting resistor (R1) being connected to a positive electrode of the switch-on energy storage capacitor (C1) and the other terminal connected to a positive terminal of the DC power supply, and a negative electrode of the switch-on energy storage capacitor (C1) being connected to a negative terminal of the DC power supply.

3. The control circuit of a bistable permanent magnet operating mechanism according to claim 1, wherein:

the switch-off energy storage circuit (FZ) comprises a secondary charging current-limiting resistor (R4) and a secondary energy storage capacitor (C3), upon series connection, connected to two terminals of the DC power supply, and a switch-off current-limiting resistor (R3) and a switch-off energy storage capacitor (C2), upon series connection, connected to two terminals of the DC power supply, wherein a second set switch-off contacts (FZJ2) of the switch-off contact switch, upon in series connection with a discharging current-limiting resistor (R5) and a switch-off diode (D3), connected to positive electrodes of the secondary energy storage capacitor (C3) and the switch-off energy storage capacitor (C2); one terminal of a quick charging current-limiting resistor (R6) being connected to a common terminal of the second set switch-off contacts (FZJ2) and the switch-off diode (D3), and the other terminal being connected to the positive terminal of the DC power supply.

* * * * *